(12) United States Patent
Machalek et al.

(10) Patent No.: US 6,573,670 B2
(45) Date of Patent: Jun. 3, 2003

(54) GEARMOTOR WITH FEEDBACK CONTROL APPARATUS AND METHOD

(75) Inventors: Kevin J. Machalek, Arlington Heights, IL (US); William C. Hittie, Jr., Mount Prospect, IL (US)

(73) Assignee: Merkle-Korff Industries, Inc., Des Plaines, IL (US)

( * ) Notice: Subject to any disclaimer, the term of this patent is extended or adjusted under 35 U.S.C. 154(b) by 4 days.

(21) Appl. No.: 09/902,078

(22) Filed: Jul. 10, 2001

(65) Prior Publication Data

US 2003/0011330 A1 Jan. 16, 2003

(51) Int. Cl.[7] .............................................. F16H 35/00
(52) U.S. Cl. ...................... 318/15; 318/652; 221/312 R
(58) Field of Search ................................ 318/565, 626, 318/652, 653, 661, 663, 671, 463, 466, 467, 468, 9, 15; 221/312 R

(56) References Cited

U.S. PATENT DOCUMENTS

| | | | |
|---|---|---|---|
| 3,653,540 A | * | 4/1972 | Offutt |
| 3,732,875 A | * | 5/1973 | Jensen et al. |
| 3,762,526 A | * | 10/1973 | Kiefer |
| 4,104,552 A | | 8/1978 | Tsergas ................. 310/156.12 |
| 4,762,250 A | * | 8/1988 | Friberg |
| 4,900,909 A | * | 2/1990 | Nagashima et al. |
| 5,444,317 A | | 8/1995 | Anderson et al. ............. 310/77 |
| 5,446,326 A | | 8/1995 | Scheider ....................... 310/83 |
| 6,102,248 A | * | 8/2000 | Yamamiya |

* cited by examiner

*Primary Examiner*—Bentsu Ro
(74) *Attorney, Agent, or Firm*—Brian R. McGiney, Esq.

(57) ABSTRACT

A vending machine includes a gearmotor with feedback control allowing for the determination and control of the axial rotational position of the gearmotor's output shaft. The gearmotor has a DC motor, gear train, at least one rotation sensing mechanism and control circuitry. The rotation sensing mechanism is in operative connection with the output shaft of the gearmotor and/or the armature shaft of the motor such that the feedback provided by the sensor allows the control circuitry to determine the position of at least one of the shafts and, based on that determination, control the output of the motor to either stop rotation or produce additional rotation as necessary to properly dispense product of varying sizes based on pre-programmed data regarding the desired rotation for various products. A method for controlling the dispensing of products in a vending machine is also disclosed.

10 Claims, 2 Drawing Sheets

GEARMOTOR WITH FEEDBACK CONTROL APPARATUS AND METHOD

FIELD OF THE INVENTION

The present invention generally relates to mechanisms for controlling the dispensing of products from vending machines. More specifically, the present invention relates to a vending machine gearmotor including a mechanism for determining and controlling the position of a gearmotor output shaft. A method for controlling the dispensing of products in a vending machine is also disclosed.

BACKGROUND OF THE INVENTION

The gearmotor of the present invention may be used to drive a vending machine rotor. Well known in the art, such rotors are axially rotating structures, usually helical or cupped and used to hold and dispense product from a point of storage or display within the machine. In most vending machines, dispensing involves axially rotating the rotor to advance product held between the coils or in the cups of the rotor until the product is released from the rotor and falls to a user accessible area of the machine.

As the amount of rotor advancement needed to release a product varies depending on the size and shape of the product, it is necessary to control the amount of axial rotation of the output shaft of the gearmotor to control the amount of axial rotation of the rotor and, therefore, the advancement of the product. In present gearmotors, this is accomplished through mechanical means, primarily mechanical switches which are tripped by protuberances molded into rotating gear shafts. Such systems require mechanical adjustment of the gearmotor, a timing cam or the use of numerous spacers to adjust for each time a different amount of advancement is needed to compensate for different sized product.

Typically in bottle and can/bottle vending machines, the output shaft of the gearmotor drives the rotor of the vending machine. Typically, the rotor is a half-moon shape in which the product lies on its side. Depending on the size of the product and the internal dimensions of the vending machine, each rotor can accommodate a set number of units of product. Depending on the product, a mechanical cam (typically attached to the output shaft of the gearmotor) will require some adjustment to properly dispense an individual product. For example, if the rotor holds three products and the cam is set to dispense one product, when the cam reaches the first detent position and the mechanical switch is activated stopping the gearmotor, the rotor may rotate to an angular position in which two products are dispensed. To accommodate the difference in package sizes, some machines include removable spacers from which the operator selects to establish the proper configuration to properly dispense the product based on its size. The present invention solves the problems associated with the prior art.

SUMMARY OF THE INVENTION

The present invention includes a gearmotor with solid-state controls to sense and control the axial rotational position of the gearmotor's output shaft and/or motor armature shaft. This control is achieved through the use of pre-programmed control circuitry which calculates the real-time position of the gearmotor output shaft. As such, the present invention is configured to provide different, predetermined amounts of output shaft and machine rotor rotation and, therefore, product advancement, based on software instructions and not mechanical modification. Thus, the present invention permits vending machine stockers to compensate for different sized products without the need of mechanical adjustment.

BRIEF DESCRIPTION OF THE DRAWINGS

A more complete appreciation of the invention and many of the advantages thereof will be readily obtained as the same becomes better understood by reference to the detailed description when considered in connection with the accompanying drawings, wherein.

DETAILED DESCRIPTION

While the present invention may be embodied in many different forms, several specific embodiments are discussed herein with the understanding that the present disclosure is to be considered only as an exemplification of the principles of the invention, and it is not intended to limit the invention to the embodiments illustrated.

Figure 1:
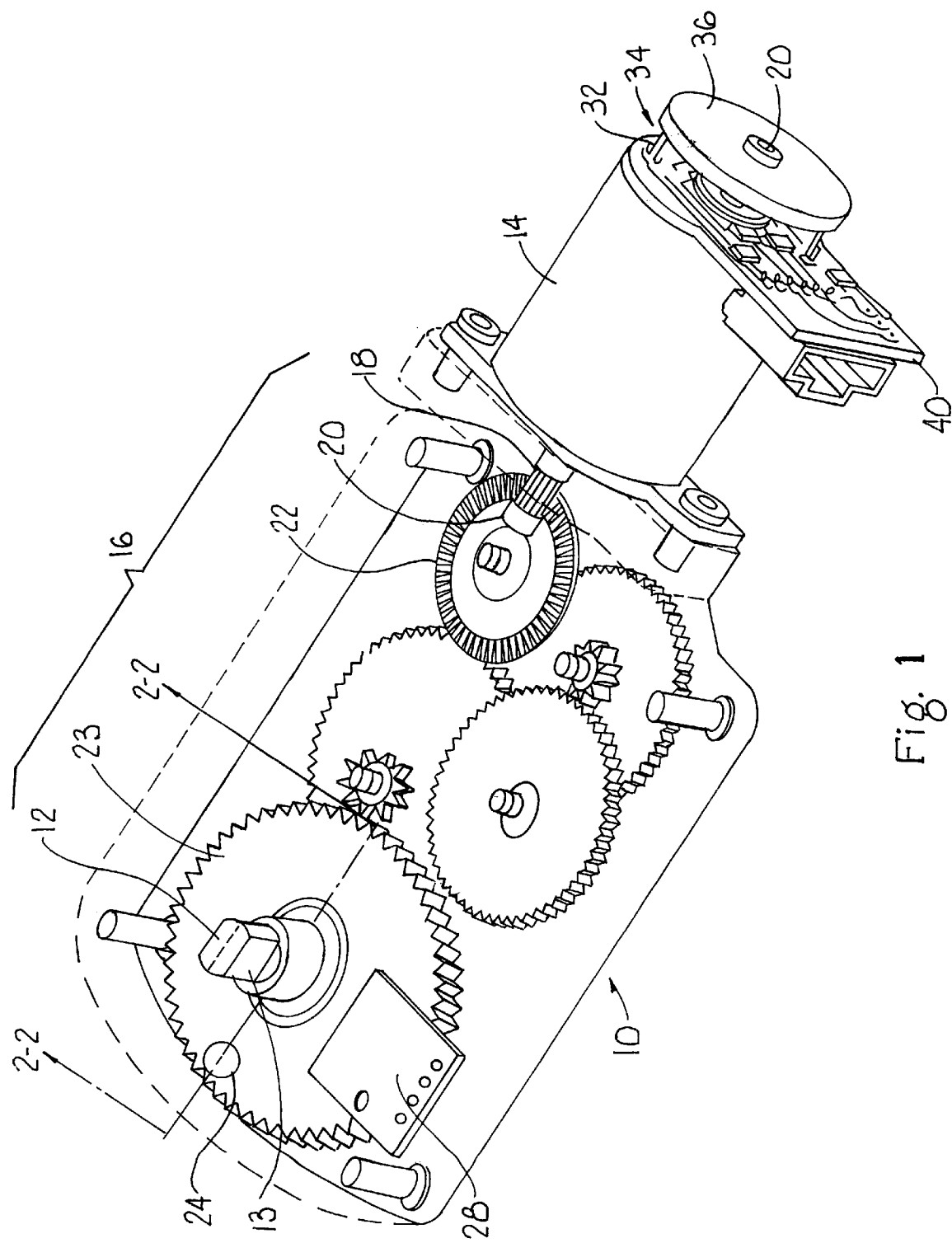
FIG. 1 is a perspective view illustrating an exemplary embodiment of a gear motor of the present invention.

FIG. 1 illustrates one embodiment of a gearmotor 10 exemplifying the present invention. As discussed herein, the present invention has particular application in vending machines as it is desired in such machines to control the amount of axial rotation of the gearmotor's output shaft in response to differing sizes of the vending products.

FIG. 1 illustrates a preferred embodiment of the invention wherein a vending machine product dispensing rotor (not shown) is in operable association with the gearmotor output shaft 12. The output shaft 12 is driven by a DC motor 14 through an armature shaft 20. As shown in FIG. 1, the output shaft 12 may be keyed 13 (i.e., flat, double flat, cross pin, etc.) so as to allow the rotor to be indexed or fixed to the output shaft 12 in a known axial rotational position. As discussed more below, an actual axial position of the rotor can be then deduced from the known position of the rotor with regard to the output shaft 12, and the calculated axial position of the output shaft 12 with regard to a known or fixed position.

The output shaft 12 is in operative connection with the motor 14 through the gear train 16. Through the gear train 16, the relatively high speed of the axial rotation of the armature shaft gear 18 is redirected and translated into the slower axial rotation of the output shaft 12. Although a particular combination of five plastic gears are illustrated in FIG. 1, numerous other arrangement and constructions of gears may be used in the present invention as is well known in the industry. For example, a crown gear 22 is shown as the initial gear which translates the axial rotation of the motor armature shaft 20 to a perpendicular axial rotation.

An alternative construction of the gear train 16 could use a worm gear and worm wheel to so translate the rotation of the armature shaft 20. Of course, various gear ratios may be used in the gear train 16 so as to adapt the gearmotor 10 to particular applications.

Figure 2:
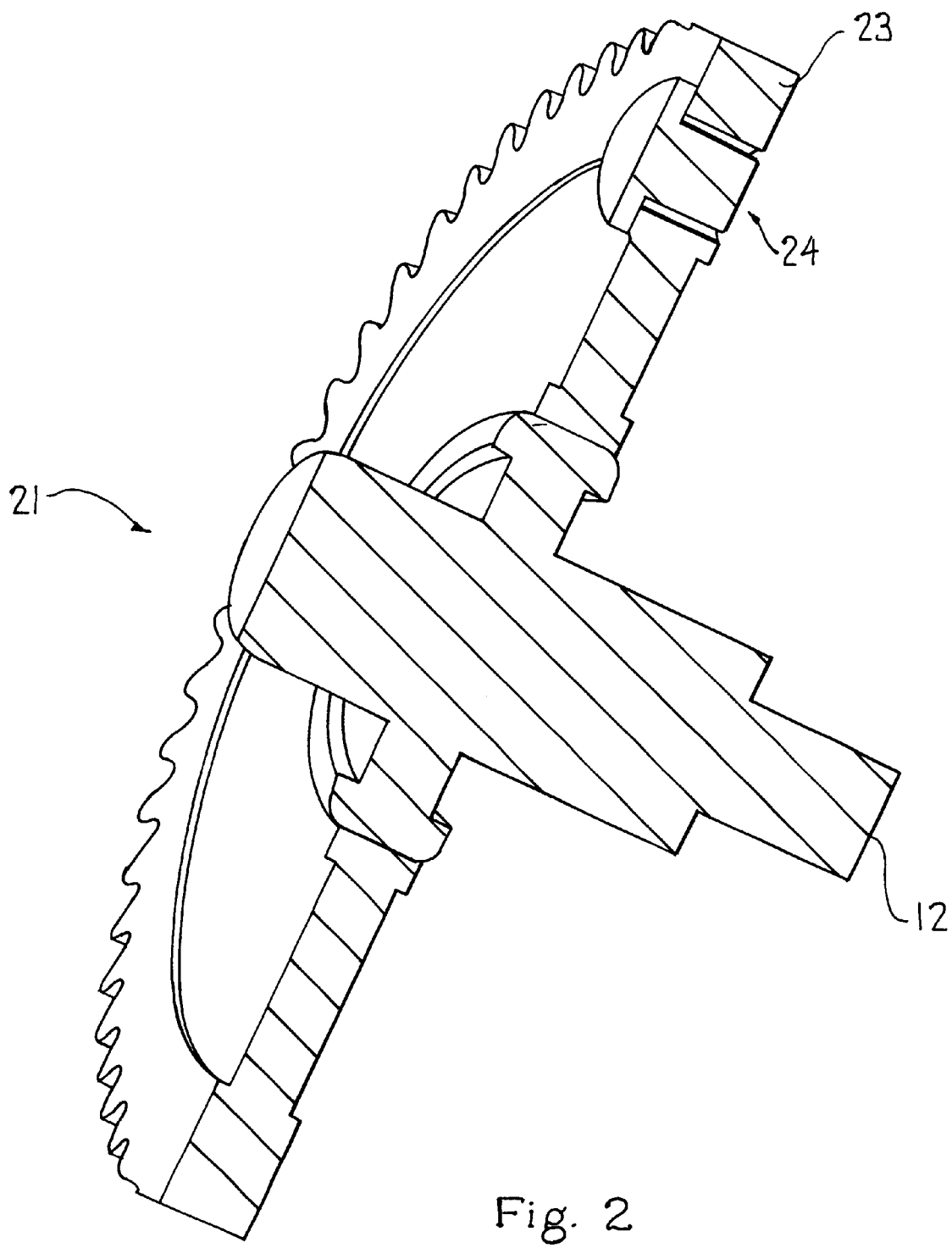
FIG. 2 is a sectional view of an output gear assembly of the gear motor of FIG. 1, taken along line 2—2 thereof.

Referring to FIG. 1 and FIG. 2, at least one non-mechanical rotation sensor mechanism (discussed more below) for sensing the rotational position of the output shaft 12 and/or the armature shaft 20, and for generating an electrical signal corresponding to a specific axial rotational position of the output shaft 12 and/or the armature shaft 20 is illustrated. The electrical signal is provided as an input to pre-programmed control circuitry or a microprocessor 40 which determines the real-time rotational position of the output shaft 12 and/or armature shaft 20. Then, based on the rotational position of the output shaft 12 and/or armature shaft 20 and the desired amount of rotation—determined by the type and size of product being dispensed—the control circuitry determines whether additional operation of the motor 14 is necessary and supplies or removes power from said motor to achieve the desired rotation.

In the preferred embodiment of the present invention illustrated in FIG. 1 and FIG. 2, a rotation sensing mechanisms for the feedback control is shown comprising first and second Hall Effect sensors 28, 32 being in operative connection with a pair of permanent magnets 24, 34 which rotate in a known relationship to the armature shaft 20 and/or the output shaft 12.

Although they may be separate components, the output shaft 12 illustrated in FIG. 1 and FIG. 2 is integral to an output shaft gear assembly comprising an output gear 23 and a first permanent magnet 24 integral to the output gear 23. It is understood, however, that the first magnet 24 may be placed on the output shaft 12, any gear in the gear train 16, or any other member in rotational connection with the armature shaft 20.

A first Hall Effect sensor 28 is shown in FIG. 1. As is known in the art, Hall Effect sensors are devices which sense a voltage created by the Hall Effect. The Hall Effect provides that when a conductor carrying a current is placed in a magnetic field, a voltage potential is generated perpendicular to the direction of both the magnetic field and the current carried in the conductor. Hall Effect sensors such as those commercially available from Energy Science, Inc. of Goleta, Calif. under the trade name AMPLOC, sense this voltage potential created by the magnetic current, called the Hall Effect voltage, and are able to pass that voltage on to other circuitry.

In the present embodiment, the first Hall Effect sensor 28 is shown positioned such that as the output gear 23 and output shaft 12 rotate axially, the first magnet 24 can pass directly underneath the first Hall Effect sensor 28 creating the first Hall Effect voltage. Of course, should the first magnet 24 be placed in one of the alternate positions defined above, the first Hall Effect sensor would be placed so as to be in operative connection with the first magnet 24 as it rotates. Similarly, as the output gear 23 continues to rotate, the first magnet 24 will cease operative connection with the first Hall Effect sensor 28 and the first voltage potential will dissipate to zero. It will be understood that other arrangements and positions of the first sensor 28, first magnet 24 and output shaft 12 will result in the necessary operative connection of these elements so as to trigger the first Hall Effect sensor 28 to release a first voltage when the first magnet 24 is at a consistently repeatable axially rotational position. For example, the first Hall Effect sensor 28 and first magnet 24 could be placed on any of the other gears in the gear train 16 and the inventive operative connection of these elements would still exist so long as the gear ratios are known and the gears are indexed to each other.

FIG. 1 also illustrates a second Hall Effect sensor 32 mounted to a printed circuit board which contains control circuitry or microprocessor 40. Although FIG. 1 illustrates the microprocessor 40 affixed to the gearmotor 10, in practice the microprocessor 40 need not be attached or affixed to the gearmotor 10, and may in fact be located at a remote location.

The second Hall Effect sensor 32 is triggered by a second magnet 34 fixed to the armature shaft 20 of the motor 14. So fixed, the second magnet 34 rotates with the armature shaft 20 when the motor 20 is operating, thereby triggering the second Hall Effect sensor 32. Although the second magnet 34 is shown fixed to the armature shaft 20 via a balanced disk 36, other methods of fixation are equally applicable as are known.

The first and second Hall Effect sensors 28, 32 are used in the preferred embodiment to provide increased resolution to properly turn the rotor to a correct position. This resolution will allow any product to be dispensed without mechanical timing adjustments. However, the present invention can also be provided with only one of the sensors 28, 32. Alternatively, more than two sensors could also be provided.

The first and second voltages produced by the first and second Hall Effect sensors 28, 32 are passed to the microprocessor 40. Similarly, information regarding the product loaded into the particular vending machine bin worked by the gearmotor 10 is input into or otherwise made available to the control circuitry 40. Based on this information and the pre-programmed data in the control circuitry 40 regarding the desired rotations required to achieve dispensing of various products, the control circuitry 40 may determine the real-time position of the output shaft 12 and/or the armature shaft 20 which may be used to determine if additional operation of the motor 14 is necessary to achieve the desired rotation for the dispensed product. If so, the control circuitry 40 may allow continued operation of the motor 14 until the desired rotation is reached. If not, the control circuitry may operate to terminate further action of the motor 14.

Although it is believed to be apparent from the forgoing discussion, the motor 14 can be used to control the angular position of the rotor based upon a number of known characteristics which include: the known axial position of the gearmotor output shaft 12 with regard to the rotor, the known position of the first magnet 24 with regard to the output shaft 12, the relative real-time position of the output shaft 12 as sensed by the sensor 28, the known gear train 16 ratio, the known axial position of the armature shaft 20 as sensed by the second sensor 32. In this regard, as microprocessor 40 receives input signals from each of the sensors 28, 32 corresponding to real-time positions of the output shaft 12 and the armature shaft 20, the microprocessor selectively control the supply of power to the motor 14 to control the position of the output shaft 12.

The microprocessor 40 can be programmed such that a user can selectively alter (e.g., increase or decrease) the amount of rotation of the rotor, for example by entering a predetermined code into an alphanumeric keypad or control panel (not shown) in operable association with the microprocessor 40. Therefore, the user can selectively alter the rotation of the rotor through a non-mechanical adjustment to accommodate different product sizes, shapes, weights, volumes, or other distinguishing product characteristics.

The non-mechanical rotation sensor may be a Hall-effect sensor as described above in the exemplary embodiment, or one or more optical sensors, one or more resolvers or other known solid state devices which can produce a signed voltage in response to a specific axial rotational position of the output shaft 12 or armature shaft 20.

Although it is believed to be apparent from the foregoing discussion, the present invention includes a method for controlling the dispensing of a product in a vending machine wherein the vending machine including a microprocessor and a gearmotor having a gearmotor output shaft in operable association with a vending machine rotor. The method comprises the steps of providing a rotation sensor mechanism for determining the position of the gearmotor output shaft; generating an electrical control signal corresponding to an axial rotational position of the output shaft; and inputting said control signal to said microprocessor to advance said vending machine rotor a predetermined amount to dispense the product.

The foregoing description of the embodiments of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and modifications as are suited to the particular use contemplated. It is intended that the scope of the invention not be limited by the specification, but be defined by the claims set forth below.

What is claimed is:

1. A vending machine gearmotor, comprising:
   a motor having an armature shaft, said armature shaft having an axial rotational position;
   a gear train in operative connection with said armature shaft;
   an output shaft in operative connection with said gear train, said output shaft having an output shaft axial rotational position; and
   a rotation sensor mechanism for sensing rotation of said armature shaft and said output shaft and for generating a first control signal corresponding to said rotation of said armature shaft and for generating a second control signal corresponding to said rotation of said output shaft.

2. The vending machine gearmotor of claim 1 wherein said rotation sensor mechanism comprises first and second Hall effect sensors.

3. The vending machine gearmotor of claim 1 wherein said rotation sensor mechanism comprises first and second optical sensors.

4. The vending machine gearmotor of claim 1 wherein said rotation sensor mechanism comprises first and second resolvers.

5. The vending machine gearmotor of claim 1, further comprising a microprocessor in operative association with said rotation sensor mechanism, said microprocessor including pre-programmed data corresponding to desired rotations of said output shaft for dispensing vending products from a vending machine, wherein said microprocessor selectively controls the position of said output shaft based upon said first and second control signals.

6. The vending machine gearmotor of claim 5, further comprising a control panel in operable association with said microprocessor such that the advancement of said output shaft can be selectively altered by an operator.

7. A method for controlling the dispensing of a product in a vending machine, said vending machine including a microprocessor and a gearmotor having a gearmotor output shaft in operable association with a vending machine rotor, the method comprising the steps of:
   providing a rotation sensor mechanism for determining the position of the gearmotor output shaft;
   generating an electrical control signal corresponding to an axial rotational position of the output shaft; and
   inputting said control signal to said microprocessor to advance said vending machine rotor a predetermined amount to dispense the product.

8. The method of claim 7 wherein said rotation sensor mechanism comprises first and second Hall effect sensors.

9. The method of claim 7 wherein said rotation sensor mechanism comprises first and second optical sensors.

10. The method of claim 7 wherein said rotation sensor mechanism comprises first and second resolvers.

* * * * *